United States Patent
Chen et al.

(10) Patent No.: US 11,856,000 B2
(45) Date of Patent: Dec. 26, 2023

(54) METHOD AND APPARATUS FOR IMPROVED SECURITY IN TRIGGER ACTION PLATFORMS

(71) Applicant: Wisconsin Alumni Research Foundation, Madison, WI (US)

(72) Inventors: Yunang Chen, Madison, WI (US); Mohannad Alhanahnah, Madison, WI (US); Andrei Sabelfeld, Hoboken, NJ (US); Rahul Chatterjee, Madisn, WI (US); Earlence Fernandes, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 384 days.

(21) Appl. No.: 17/339,273

(22) Filed: Jun. 4, 2021

(65) Prior Publication Data
US 2022/0394043 A1     Dec. 8, 2022

(51) Int. Cl.
*H04L 9/40* (2022.01)
*H04L 9/32* (2006.01)

(52) U.S. Cl.
CPC .......... *H04L 63/123* (2013.01); *H04L 9/3247* (2013.01)

(58) Field of Classification Search
CPC ... H04L 63/123; H04L 9/3247; H04L 9/3213; H04L 63/126; H04L 63/0263; H04L 63/205
See application file for complete search history.

(56) References Cited

U.S. PATENT DOCUMENTS

| | | | | |
|---|---|---|---|---|
| 5,202,995 A | * | 4/1993 | O'Brien | G06F 8/443 717/160 |
| 5,729,741 A | * | 3/1998 | Liaguno | G06F 16/40 704/270.1 |
| 7,725,887 B2 | * | 5/2010 | Wu | G06F 8/4434 717/159 |
| 10,924,275 B1 | * | 2/2021 | Kumar | H04L 9/14 |
| 2006/0095552 A1 | | 5/2006 | Dini et al. | |

(Continued)

FOREIGN PATENT DOCUMENTS

| | | | | | |
|---|---|---|---|---|---|
| CN | 104904196 A | * | 9/2015 | ............ | G06F 3/1454 |
| CN | 106339918 A | * | 1/2017 | ......... | G06Q 30/0635 |

(Continued)

OTHER PUBLICATIONS

Yunang Chen, Data Privacy in Trigger-Action Systems, University of Wisconsin-Madison ,[Submitted on Dec. 10, 2020 (v1), last revised May 24, 2021 (this version, v3)] 18 pages (Year: 2020).*

(Continued)

*Primary Examiner* — Shahriar Zarrineh
(74) *Attorney, Agent, or Firm* — Boyle Fredrickson, S.C.

(57) ABSTRACT

An apparatus and method for improving the security of trigger action platforms of a type providing interoperability between computer services send the trigger service additional information about an interoperability rule for the computer services so that the trigger service may implement a minimizer reducing the data communicated when the interoperability is implemented. Implementation of the minimizer may be done in a way that is transparent to the trigger action platform eliminating the need for disruption of existing interoperability services.

18 Claims, 3 Drawing Sheets

(56) References Cited

U.S. PATENT DOCUMENTS

2016/0378756 A1\* 12/2016 Kemp .................. G06F 16/248
707/722
2019/0334906 A1    10/2019 Morris et al.
2021/0026626 A1\*  1/2021 Jain .................... G06F 9/44505

FOREIGN PATENT DOCUMENTS

| EP | 3382979 B1     | 1/2020 |
|----|----------------|--------|
| KR | 20110027809 A  | 3/2011 |
| WO | 2007079233 A2  | 7/2007 |

OTHER PUBLICATIONS

Deepak Sirone Jegan, TAPDance: Architecting Trigger-Action Platforms for Security, Performance and Functionality, University of Wisconsin—Madison, 17 pages.\*

International Search Report for PCT/US2022/030490 dated May 23, 2022.

\* cited by examiner

METHOD AND APPARATUS FOR IMPROVED SECURITY IN TRIGGER ACTION PLATFORMS

STATEMENT REGARDING FEDERALLY SPONSORED RESEARCH OR DEVELOPMENT

This invention was made with government support under N00014-17-1-2889 awarded by the NAVY/ONR. The government has certain rights in the invention.

CROSS REFERENCE TO RELATED APPLICATION

--

BACKGROUND OF THE INVENTION

The present invention relates to trigger action platforms which link different computer services to work together and in particular to increasing the security of user data during such interoperation.

Trigger action platforms (TAPs) link different computer services from different providers together over the Internet. For example, a trigger action platform may link a user's email program managed by a first provider to the user's personal home assistant managed by a second provider to allow the latter to announce particular emails have arrived.

The user of a TAP may communicate with the TAP over his or her web browser to define simple rules, for example, "If an email arrives from my bank, have my personal home assistant announce that arrival and the subject to me." The user then authorizes the service providers for the email service and the personal home assistant service to permit communication with the TAP. In one example, the TAP provides trigger conditions to the email service (a trigger computer service (TS)) causing the TS to send email data (attributes) to the TAP when the trigger condition is satisfied. The TAP then sends an action request to the personal home assistant service (an action computer service (AS)) based on the attributes, for example, an email sender name and subject line. The AS responds to this request by generating a voice message to the user, for example, "You have received a message from your bank related to your checking account."

The TAP is able to link together otherwise incompatible services by developing a library describing TS and AS application program interfaces (APIs) exposed by the various services and by encouraging the use of a compatibility layer in the operating programs of the TS and AS that wish to be compatible with the TAP thus standardizing these APIs. This approach permits cross service automation while allowing services to evolve independently and allowing new services to be developed freely. Importantly, the TAP allows the benefit of interoperability to be obtained outside of a monolithic single service provider, thus preserving the vitality of competition.

One problem with TAPs is that they potentially expose large amounts of user data (transferred from the TS to the TAP) such as might be exploited by a malicious actor either by an attack on the TAP or by a malicious TAP itself. Generally the TS, once authorized by the user, will execute any API requested by the TAP ("token level over-privilege") and, for any given API executed, will send more attribute data than necessary (attribute level over-privilege") because the rule being executed by the TAP, and hence the purpose of the data, is unknown to the TS.

Naïvely, the amount of data exposed by attribute level over-privilege could be reduced by having the TS implement the user's rules without the TAP but this would break the independence between the TS and the AS, a desirable property that allows them to evolve independently. Alternatively, attribute level over-privilege could be reduced by fine grain APIs that each provide only limited information for a particular rule, but this would create additional problems of maintenance of the APIs as different services evolve. Token level over-privilege could be addressed by authorizing only specific APIs by the user but at the cost of much increased burden to the user who would have to re-authorize on every rule change.

SUMMARY OF THE INVENTION

The present invention greatly increases the security of TAP usage by implementing a minimizer program at the TS to actively filter out unnecessary attribute data from being transmitted. The minimizer program is informed by auxiliary data generated as the user generates the TAP rule. This auxiliary data can be passed transparently through the TAP to the minimizer at the TS requiring no change in the TAP operation. Cryptographic signatures can reduce the chance of tampering or modification with the minimizer program or other features of the rule, and the auxiliary information can be constructed so as not to reveal the actions implemented by the rule.

In one embodiment, the invention operates on one or more programmed electronic computers of: a user computer, a trigger action provider (TAP), and a trigger service (TS) to: (a) generate a rule by a user on a user computer, the rule including a trigger condition, and (b) to provide the rule to the TAP together with auxiliary information based on the rule. The auxiliary information is then (c) sent to the TS to implement a minimizer program on the TS operating to limit attribute data to be sent to the TAP upon satisfaction of the trigger condition when that attribute data is not necessary to implement the actions of the rule.

It is thus a feature of at least one embodiment of the invention to improve the security of trigger action platforms by reducing the transmission of unnecessary attribute data. It is another object of the invention to provide this reduction in attribute data without the need to create a large number of hard to manage special-purpose APIs providing pre-minimized attribute data.

The minimizer may statically analyze the auxiliary data to determine which attributes are necessary to implement the rule and remove those attributes not necessary to implement the rule.

It is thus a feature of at least one embodiment of the invention to provide a lightweight minimizer that can be simply and robustly implemented by the trigger service.

Alternatively, the minimizer may dynamically execute a simplified version of the rule contained in the auxiliary data based on the trigger condition to determine which attributes are necessary to implement the rule given satisfaction of the trigger condition and limit those attributes not necessary to implement the rule.

It is thus a feature of at least one embodiment of the invention to provide for aggressive and more precise reduction of attribute data transmission using runtime knowledge.

The auxiliary information may be digitally signed, and trigger service may check a cryptographic signature of the auxiliary information to verify the auxiliary information is that provided by the user.

It is thus a feature of at least one embodiment to eliminate the possibility of tampering with the auxiliary data between the user and the trigger service.

Alternatively, or in addition, the trigger condition may be digitally signed, and the trigger service may check the cryptographic signature of the trigger condition to verify that the trigger condition is that provided by the user.

It is thus a feature of at least one embodiment of the invention to further improve the security of trigger action platforms by preventing a malicious change in the trigger conditions.

The attribute data may be limited by sending null values in the place of limited attribute data.

It is thus a feature of at least one embodiment of the invention to remove attribute data without disrupting the data format expected to be seen by the trigger action platform, thus allowing the system to work without modification of existing trigger action platforms.

The auxiliary data may be sent to the trigger action platform in a format that looks like a trigger condition of a rule is sent to the TS.

It is thus a feature of at least one embodiment of the invention to allow the trigger action platform to forward the necessary auxiliary data to the trigger service without the need to modify the normal behavior of the trigger action platform which treats the auxiliary data simply as another trigger condition.

The auxiliary data may be structured to not reveal rule action requests.

It is thus a feature of at least one embodiment of the invention to prevent security leaks of action requests (and, for example, the action service) to the trigger service or others.

The user computer may execute a browser communicating with the trigger action computer service to define the rule and wherein a browser plug-in generates the auxiliary data.

It is thus a feature of at least one embodiment of the invention to make use of security features of devices, such as cell phones or the like, to create a trusted client for generation of the cryptographic signatures and auxiliary data.

These particular objects and advantages may apply to only some embodiments falling within the claims and thus do not define the scope of the invention.

DETAILED DESCRIPTION OF A PREFERRED EMBODIMENT

Hardware Environment

Figure 1:
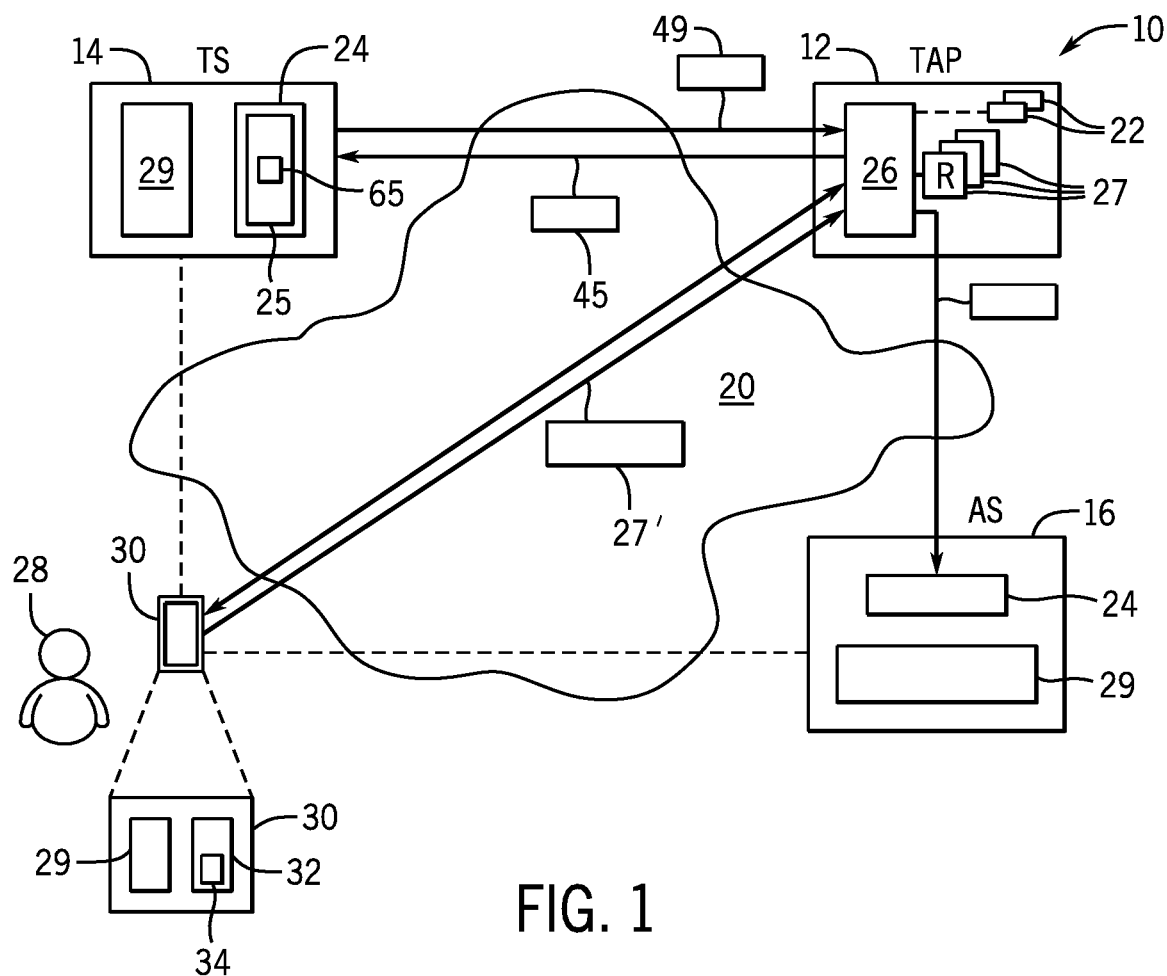
FIG. 1 is a simplified block diagram showing computer services including a trigger service and action service interconnected over the Internet with a user device and a trigger action platform.

Referring now to FIG. 1, a system 10 for minimizing data exposure may work with a trigger action platform computer service 12 (TAP) of a type providing interoperability between a trigger computer service (TS) 14 and an action computer service (AS) 16, all communicating on the Internet 20. Example TAPs 12 include: IFTTT (if this than that), Zapier, and Microsoft Power Automate. Examples of TS 14 and AS 16 may include a wide variety of Internet services including email services such as Microsoft Outlook, collaboration services such as Slack, social networks such as Facebook, file transfer services such as Dropbox, commerce services such as eBay, as well as Internet connected appliances such as Google assistant, Amazon's Alexa, and Apple Computer's Siri, each of which may serve variously as either a TS 14 or AS 16.

Generally, the TAP 12 will provide a directory 22 of application program interfaces (APIs) provided by each different TS 14 and AS 16 allowing the TAP 12 to request data from a TS 14 and request actions by the AS 16, respectively. Further, each of the TS 14 and AS 16 may include a compatibility program 24 providing a common communication interface with the TAP 12 and recognizing a common authorization procedure for such authorizing communication (such as OAuth) as will be discussed below. As will also be discussed in more detail below, the compatibility program 24 for a device acting as a TS 14 may also include a shim program 25 per the present invention.

Each of the TAP 12, TS 14, and AS 16 will generally be implemented by one or more electronic computers having processors communicating with electronic memory and network interface circuitry providing network communication over the Internet 20. The electronic memories of the TS 14 and AS 16 will include operating programs 29 related to the services they provide (for example, an email server for email services). This operating program 29 may also provide for the authorization procedure for use with the TAP 12 mentioned above.

The electronic memory of the TAP 12 will also include an operating program 26, in this case, communicating with the directory 22 and a set of user-defined stored rules 27 to implement interoperability between the TS 14 and AS 16. Generally, the terms "service" and "computer service" refer to a combination of hardware and software necessary to implement a particular functionality.

Each of the TAP 12, TS 14, and AS 16 may also communicate with a user 28 via a user device 30 such as a cell phone or desktop computer. The user device will also include one or more processors, computer memory, and a network interface for communicating over the Internet 20. The invention contemplates, in one embodiment, that the user device 30 will include a browser program 32 having a browser extension 34 per the present invention as will be discussed below. The user 28, using the user device, 30 may communicate with the TAP 12 to create the user-defined stored rules 27, allowing the user 28 to orchestrate a cooperation between the user's services of the TS 14 and AS 16.

Security Protocol

Figure 2:
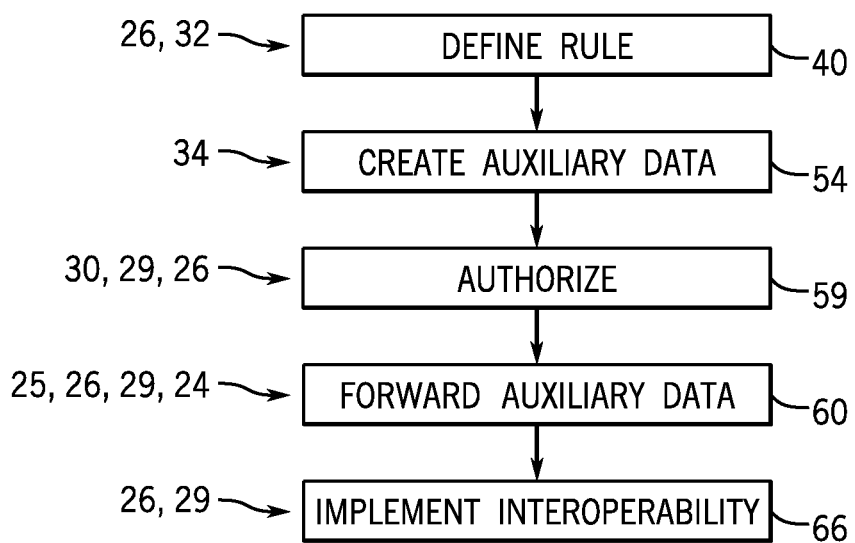
FIG. 2 is a flowchart of the operation of the computer services of FIG. 1 in providing reduced data exposure per the present invention.
Figure 3:
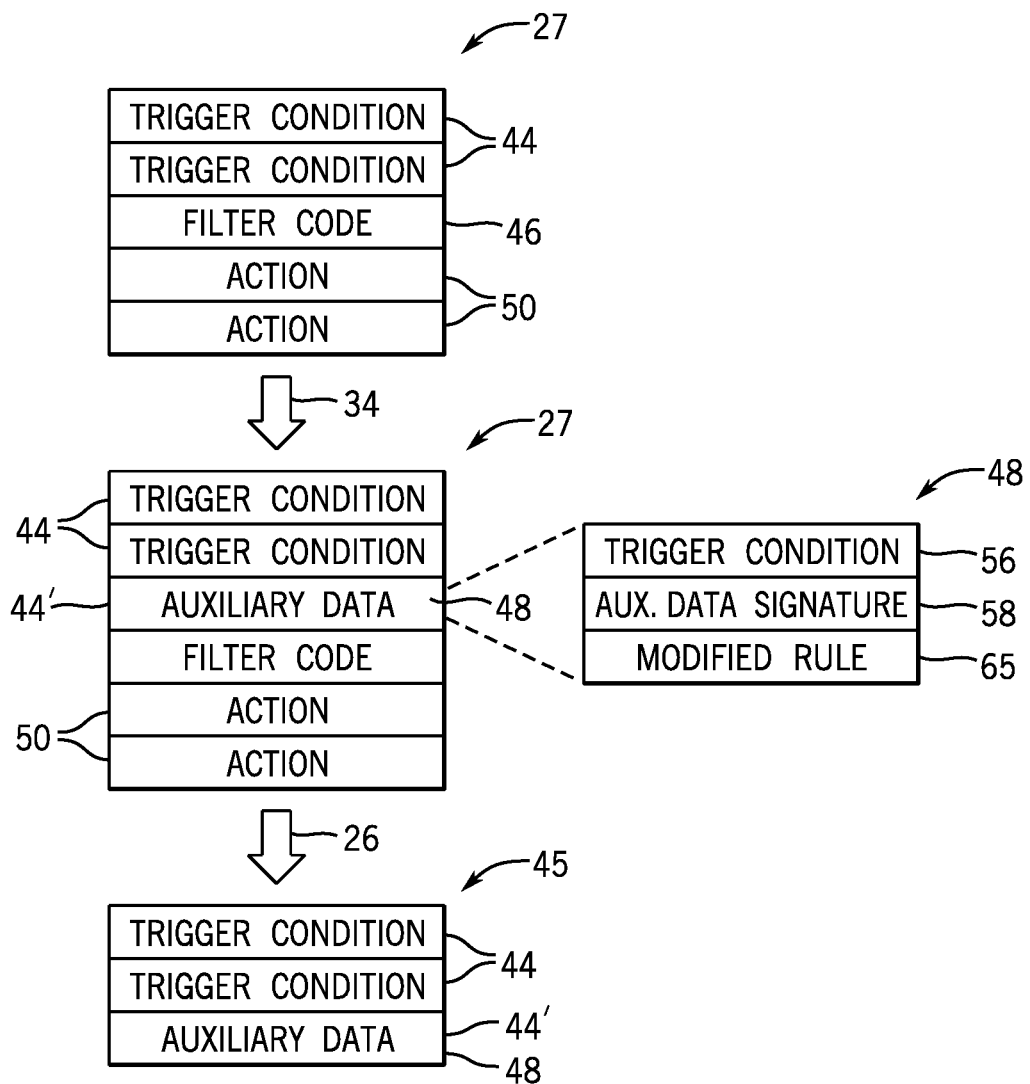
FIG. 3 is a data transformation diagram showing the generation of a rule for the trigger action platform by a user and its conversion into auxiliary data and transmission to a trigger service.

Referring now also to FIGS. 2 and 3, the system 10 may be invoked to coordinate different computer services of a TS 14 and AS 16, as indicated by process block 40, by the user 28 communicating with the TAP 12 using the browser program 32. For this purpose, the program 29 of the TAP 12 implements a Web server providing the user 28 with a browser-based interface for the creation of a rule 27 (shown in FIG. 3) including one or more trigger conditions 44.

In the example of the TS 14 being an email server, the trigger conditions 44 may be as simple as sending all mail from this user 28 to the TAP 12. Alternatively, the trigger conditions 44 may provide for more sophisticated conditions such as sending mail only from a specific user or at a specific time. The trigger conditions available will be described by the APIs for the particular TS 14 and will cause the TS 14 to respond by sending one or more attributes 49 (shown in FIG. 1) to the TAP 12. This response may be implemented either by a polling of the TS 14 by the TAP 12 or by push notifications from the TS 14 to the TAP 12.

The rule 27 may also provide for filter code 46 testing the attributes 49 received on the trigger conditions 44 and, based on those tests, invoking particular actions 50 as action requests 52 (shown in FIG. 1) from the TAP 12 to the AS 16. For example, following the above example, the filter code 46 may test the date of receipt of the email revealed by an attribute 49 and may cause an action 50 on the AS 16, for example, sending a text message to the user 28.

An example rule 27 may be expressed in pseudocode in Table I as follows:

TABLE I

Forward to the TAP 12 attribute data for email where email.sender==bank
{
  if (email.time is between 9:00 am and 5:00pm)
    {
    assistant.announce("email from bank");
    }
  else skip;
} where "email.sender==bank" is a trigger condition 44 triggered when email to the particular user has a sender that is in the user's bank. The TS 14 will respond to this trigger condition 44 by forwarding all email (as attributes 49) to the TAP 12.

The TAP 12 then tests the time of arrival of the email (email time) against the filter code condition "email.time between 9:00 am and 5:00 pm." An action request 52 of "assistant.announce ("email from bank")" will then be sent from the TAP 12 to the AS 16 to be implemented by the AS 16 based on the testing by the TAP 12 described above which in turn is based on the review by the TAP 12 of the data of the attributes 49. The action request 52 from the TS 14 provides that AS 16 perform the action 50 of verbally announcing the phrase "email from bank." The filter code 46 is thus the logical structure of the rule 27 expressed above. Generally, the trigger conditions 44 are managed by the TS 14 and the actions 50 are managed by the AS 16.

At succeeding process block 54, the browser extension 34 of the browser program 32 of the user device 30 (shown in FIG. 1) converts the rule 27 generated cooperatively by the user device 30 and the TAP 12 to a modified rule 27 (also shown in FIG. 3). The browser extension 34, for example, may operate by recognizing the TAP 12 URL and intercepting the rule 27 and modifying it to be rule 27' before the rule 27 is sent to the TAP 12. In this way, the operation of the invention may be invisible to the user 28, however, the invention also contemplates purpose-written applications or the like for this purpose.

The difference between the rule 27 and the modified rule 27 will be the addition of auxiliary data 48. The auxiliary data 48 is formatted to look like trigger condition 44 allowing the modified rule 27 to be accommodated by the TAP 12 without any modification of the program 26 of the TAP 12. As will be discussed, the TAP 12 will forward this auxiliary data 48 to the TS 14 along with other conditions 44 as part of its standard programming.

Referring still to FIG. 3, the auxiliary data 48 captures the essential logic of the rule 27 including the conditions 44 and actions 50 in a lightweight rule 65, which will be discussed in more detail below. The auxiliary data 48 also includes cryptographic signatures 58 for the lightweight rule 65 (to validate that they have not been changed since being sent by the user device 30) as well as cryptographic signatures 56 to authenticate the trigger conditions 44 for additional security.

Referring again to FIG. 2, after the rule 27 is defined and the modified rule 27 is generated and sent to the TAP 12, at succeeding process block 59, the user 28 will authorize the TS 14 and AS 16 to work with the TAP 12, a process which will be described in more detail below. This authorization process may occur any time before interoperability begins.

At next process block 60, the TAP 12 may forward in an API call 45 holding the conditions 44 and 44' (having the auxiliary data 48) to the TS 14 per normal operation of the TAP 12. At the TS 14, per process block 70, the auxiliary data 48 is recognized by the shim program 25, for example, as being a trigger condition 44 associated with a unique API associated with the protocol of the invention. The shim program 25 checks the cryptographic signatures 56 and 58 of the conditions 44 and lightweight rule 65 per decision block 72. No further action on the rule 27 is taken if the cryptographic signatures comparison fails. If the cryptographic signatures 56 and 58 are satisfied, the TS 14 provides for execution of a minimizer implemented by the shim program 25 before fulfilling any data requested by the conditions 44 per process block 74. This minimizer, as will be described in more detail below, greatly limits the attributes 49 exposed by the TS 14.

The minimizer of the shim program 25 is informed by the lightweight rule 65 in reducing the data of the released attributes 49. An example lightweight rule 65 based on the rule 27 of Table I described above, for example, may be expressed as pseudocode as follows:

TABLE II

Forward to the TAP 12 attribute data for email where email.sender==bank
{
  if (email.time is between 9:00 am and 5:00pm)
    {
    stub 1;
    }
  else skip;
}

This lightweight rule 65 retains the logic of the filter code 46 and importantly indicates all of the attributes from the TS 14 necessary to implement the rule 27. The actions 50, however, are generally replaced with unique stub values (arbitrarily chosen) to prevent privacy leakage of action request 52 to the TS 14.

At succeeding process block 66 (of FIG. 2) and process block 74 (of FIG. 5), the minimizer of the shim program 25, whenever the trigger conditions 44 are met but before attributes 49 are provided to the TAP 12, may analyze the lightweight rule 65 either statically or dynamically.

When the minimizer operates statically, it analyzes all of the attributes 49 of the lightweight rule 65 necessary to implement the rule 27. In this case, static analysis indicates that the attributes of email.sender and email.time are required for the lightweight rule 65 and accordingly only these attributes 49 will be forwarded to the TAP 12. All other attributes 49 (for example, the subject of the email and the body of the email text) are not sent to the TAP greatly minimizing the amount of data exposed by the TS 14.

Alternatively, when the minimizer operates in the dynamic mode, it executes the lightweight rule 65 at runtime to see which attributes 49 slated to be sent according to the trigger conditions 44 actually produce an action request 52. This may be done by instrumenting execution of the rule itself to see which attributes slated to be sent affect the trigger. For example, the minimizer of the shim program 25 reviews the attributes "email.time" of all the emails satisfying the trigger conditions 44 and if the email.time does not meet the condition of being between 9:00 am and 5:00 μm, and the lightweight rule 65 indicates arrival at a "skip" condition, the shim program 25b does not send that email (or its attributes 49). The dynamic minimizer may execute in a sandbox to limit possible risks from malicious code. A decision about whether to run the static or dynamic minimizer may be through configuration of the shim program 25 and the user's desired level of privacy.

When particular attributes 49 are suppressed by the shim program 25 without suppression of other attributes of a given email, the fields for the suppressed attributes 49 in the API response are set to null values (per process block 76 of FIG. 5 to be discussed) to be accommodated by the TAP 12 without any changes required in the programming of the TAP 12. The TAP 12 receives the stripped-down attributes 49 and processes it in the same manner as always to produce actions to be sent for execution by the AS 16.

Cryptographic Signatures

Figure 4:
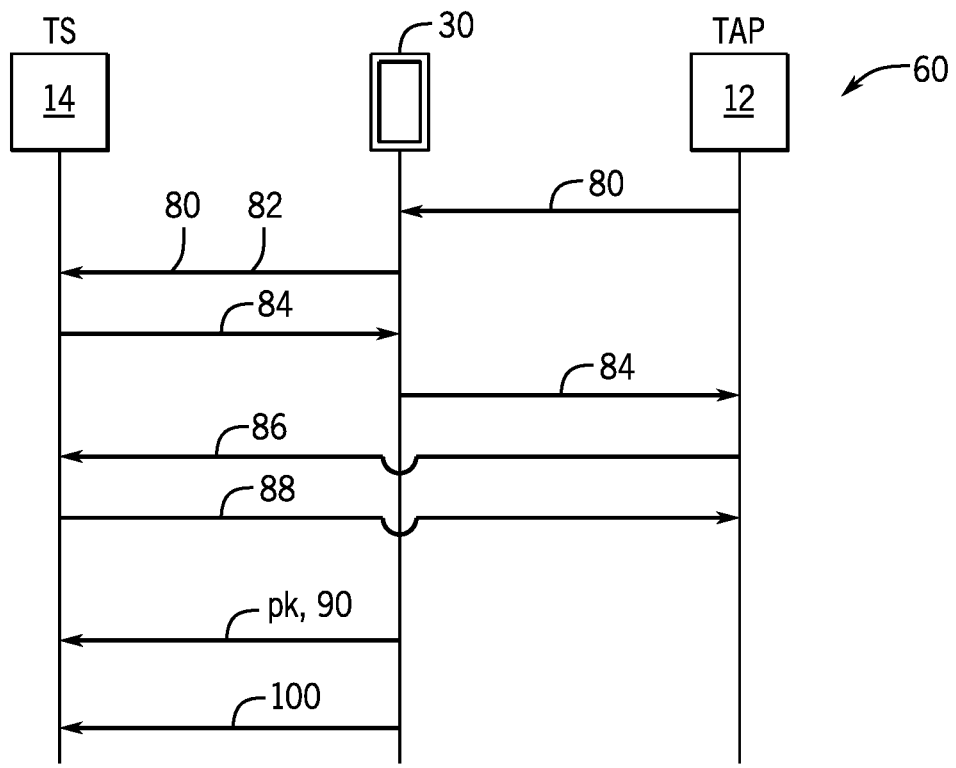
FIG. 4 is a data exchange diagram showing intercommunication between the user device, the trigger action platform, and the trigger service in providing authorization for interoperability and cryptographic signatures.
Figure 5:
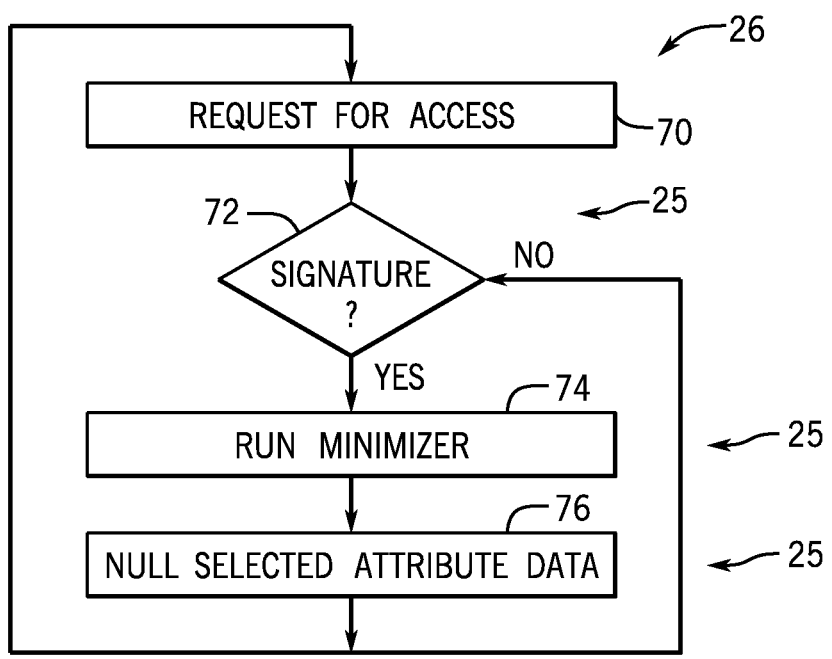
FIG. 5 is a flowchart of a program executed by the trigger service using a shim program per the present invention.

Referring now to FIGS. 4 and 5, as noted above, the auxiliary data 48 and other trigger conditions 44 may be cryptographically signed by cryptographic signatures 56 and 58 (shown in FIG. 3). Implementing the signatures can be done during the normal authorization of the TAP 12 to work with the TS 14 and AS 16 currently required, for example, using the existing OAuth 2.0 authorization code flow.

As previously described, once a user 28 has developed a rule 27, for example, as indicated by process block 40 of FIG. 2, the TAP 12 may be authorized to communicate with the services TS 14 and AS 16. Referring to FIG. 4, for this purpose, the TAP 12 may request authorization per authorization request message 80 to the user device 30, for example, following OAuth 2.0. This is a one-time operation that occurs the first time the user programs a rule 27 with a new service TS 14 or AS 16. Subsequent rules 27 involving the same services do not go through the authorization process.

After receiving the authorization request message 80, user device 30 then logs into the TS 14 and forwards the authorization request 80 to the TS 14 together with a code challenge 82 added to the normal authorization process. The code challenge 82 is produced by generating a large random string and computing its cryptographic hash value, for example, based on the OAuth Proof Key for Code Exchange (PKCE) specification. The resultant random string will be referred to as a code verifier 90 as described below. These steps may be implemented by the browser extension 34 and combinations of the shim program 25 and operating program 29 of the TS 14.

The TS 14 then provides an authorization code 84 to the user device 30 which may be forwarded to the TAP 12 and the user device 30 records this authorization code 84 for later use.

Following the example OAuth workflow, the TAP 12 may then send a token request 86 to the TS 14 directly such as allows the TAP 12 to request data using the APIs of the TS 14, and the TS may respond with a token 88 that will be used to validate future requests by the TAP 12.

At this time, user device 30 may create a service-specific public cryptographic key pair (sk, pk). Concurrently with the sending of the token request 86 by the TAP 12, the user device 30 may send the public key pk and code verifier 90 (described previously) to the TS 14 which allows the TS 14 to verify the cryptographic signatures 56 and 58 as coming from the user 28 as discussed previously. The TS 14 may reply with a special token 100 which may be used to revoke the public key or upload a new one later if desired by the user device 30.

At the conclusion of this process, the TS 14 may be certain that the trigger conditions 44 and the lightweight rule 65 used to control the release of attributes 49 is reliably from the user 28. The invention contemplates that the user device 30 is a trusted device, for example, secured by passwords and/or biometric signatures.

Certain terminology is used herein for purposes of reference only, and thus is not intended to be limiting, for example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to an electronic computer can be understood to include one or more computers that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A system for minimizing data exposure when using a trigger action platform computer service (TAP) of a type providing a trigger condition to a trigger computer service (TS) to receive attribute data upon the trigger condition and providing action requests to an action computer service (AS) based on the attribute data and rules by a user from a user computer, the system comprising:
   programmed electronic computers of a user computer, a TAP, and a TS operating to:
   (a) generate a rule by a user on a user computer, the rule including a trigger condition;
   (b) provide the rule to the TAP together with auxiliary information based on the rule; and
   (c) send auxiliary information to the TS to implement a minimizer program on the TS operating to limit attribute data to be sent to the TAS upon satisfaction of the trigger condition when that attribute data is not necessary to implement the actions requests of the rule.

2. The system of claim 1 wherein the minimizer program statically analyzes the auxiliary data to determine which attributes are necessary to implement the rule and removes those attributes not necessary to implement the rule.

3. The system of claim 1 wherein the minimizer program dynamically executes a simplified version of the rule contained in the auxiliary data based on the trigger condition to determine which attributes are necessary to implement the rule given satisfaction of the trigger condition and limits those attributes not necessary to implement the rule.

4. The system of claim 1 wherein the auxiliary information is digitally signed, and the TS checks a cryptographic signature of the auxiliary information to verify the auxiliary information is that provided by the user.

5. The system of claim 1 wherein the trigger condition is digitally signed, and the TS checks a cryptographic signature of the trigger condition to verify that the trigger condition is that provided by the user.

6. The system of claim 1 wherein the attribute data is limited by sending null values in place of limited attribute data.

7. The system of claim 1 wherein the auxiliary data is sent to the TAP in the form of a trigger condition portion of a rule.

8. The system of claim 1 wherein the auxiliary data does not reveal rule action requests.

9. The system of claim 1 wherein the user computer executes a browser communicating with the trigger action computer service to define the rule and wherein a browser plug-in generates the auxiliary data.

10. A method of minimizing data access when using a trigger action platform computer service (TAP) of the type providing a trigger condition to a trigger computer service (TS) to receive attribute data upon the trigger condition and providing action requests to an action computer service (AS) based on the attribute data and rules by a user from a user computer, the method comprising:
    (a) generating a rule by a user on a user computer, the rule including a trigger condition;
    (b) providing the rule to a TAP together with auxiliary information based on the rule; and
    (c) sending the auxiliary information to a TS to implement a minimizer program on the TS operating to limit attribute data to be sent to the TAS upon satisfaction of the trigger condition when that attribute data is not necessary to implement the action requests of the rule.

11. The method of claim 10 wherein the minimizer statically analyzes the auxiliary data to determine which attributes are necessary to implement the rule and removes those attributes not necessary to implement the rule.

12. The method of claim 10 wherein the minimizer dynamically executes a the rule contained in the auxiliary data based on the trigger condition to determine which attributes are necessary to implement the rule given satisfaction of the trigger condition and limits those attributes not necessary to implement the rule.

13. The method of claim 10 wherein the auxiliary information is digitally signed, and the TS checks a cryptographic signature of the auxiliary information to verify the auxiliary information is that provided by the user.

14. The method of claim 10 wherein the trigger condition is digitally signed, and the TS checks a cryptographic signature of the trigger conditions to verify that the trigger condition is that provided by the user.

15. The method of claim 10 wherein the attribute data is limited by sending null values in place of limited attribute data.

16. The method of claim 10 wherein the auxiliary data is sent to the TAP in the form of a trigger condition portion of a rule.

17. The method of claim 10 wherein the auxiliary data does not reveal rule actions.

18. The method of claim 10 wherein the user computer executes a browser communicating with the trigger action computer service to define the rule and wherein a browser plug-in generates the auxiliary data.

* * * * *